United States Patent
Krishnaswamy

(10) Patent No.: US 9,544,608 B1
(45) Date of Patent: Jan. 10, 2017

(54) LOSSLESS IMAGE COMPRESSION FOR FEW-COLORED IMAGES

(71) Applicant: Microsoft Corporation, Redmond, WA (US)

(72) Inventor: Sumanth Srinivasa Krishnaswamy, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/791,296

(22) Filed: Jul. 3, 2015

(51) Int. Cl.
| | |
|---|---|
| G06K 9/36 | (2006.01) |
| H04N 19/186 | (2014.01) |
| H04N 19/119 | (2014.01) |
| H04N 19/122 | (2014.01) |
| H04N 19/33 | (2014.01) |
| H04N 19/176 | (2014.01) |
| H04N 19/13 | (2014.01) |

(52) U.S. Cl.
CPC .......... *H04N 19/186* (2014.11); *H04N 19/119* (2014.11); *H04N 19/122* (2014.11); *H04N 19/13* (2014.11); *H04N 19/176* (2014.11); *H04N 19/33* (2014.11)

(58) Field of Classification Search
USPC .............. 382/166, 162, 232, 233, 244, 263, 190,382/305; 235/454, 462.22, 462.23; 340/955, 340/982; 356/152.1; 358/3.26, 3.27; 345/443, 345/630; 369/100, 275.2; 703/2; 707/E17.02; 711/1, 100
See application file for complete search history.

(56) References Cited

U.S. PATENT DOCUMENTS

| | | | |
|---|---|---|---|
| 5,056,079 A * | 10/1991 | Chung ............... | G11B 7/00451 369/100 |
| 5,408,542 A | 4/1995 | Callahan | |
| 5,412,486 A | 5/1995 | Bannai et al. | |
| 5,734,744 A | 3/1998 | Wittenstein et al. | |
| 5,995,214 A * | 11/1999 | Bruckstein ............. | G01B 11/26 340/955 |
| 6,683,978 B1 | 1/2004 | Iourcha et al. | |
| 6,823,082 B2 | 11/2004 | Hu | |
| 7,046,387 B1 | 5/2006 | Yagishita et al. | |
| 7,184,603 B2 | 2/2007 | Gringeler et al. | |

(Continued)

FOREIGN PATENT DOCUMENTS

EP    1574996    9/2005

OTHER PUBLICATIONS

Tsai, et al., "A Quad-Tree Decomposition Approach to Cartoon Image Compression", In IEEE 8th Workshop on Multimedia Signal Processing, Oct. 3, 2006, pp. 456-460.

(Continued)

*Primary Examiner* — Anh Do
(74) *Attorney, Agent, or Firm* — Jessica Meyers; Doug Barker; Micky Minhas

(57) ABSTRACT

Architecture that utilizes characteristics of high spatial redundancy and few colors in few-colored images to compress the image data in a hierarchical manner, and store block level information. The entire image is decomposed into fixed-size blocks, and the block color information (single-colored or multi-colored) is stored. All multi-colored blocks are further divided into smaller blocks (sub-blocks) in a lower level, and the sub-block information is stored as well. The process is performed recursively until there are no more multi-colored blocks, or until the block size reaches a minimum size (e.g., a 1×1 block or one pixel). The information is then entropy coded.

20 Claims, 6 Drawing Sheets

(56) References Cited

U.S. PATENT DOCUMENTS

| | | | |
|---|---|---|---|
| 7,296,749 B2 * | 11/2007 | Massieu | G02B 3/14 |
| | | | 235/454 |
| 7,606,429 B2 | 10/2009 | Aleksic et al. | |
| 8,280,159 B2 | 10/2012 | Kojima et al. | |
| 8,559,741 B2 | 10/2013 | Chan et al. | |
| 8,615,138 B2 | 12/2013 | Alakuijala | |
| 2001/0036308 A1 | 11/2001 | Katayama et al. | |

OTHER PUBLICATIONS

Pearlman, et al., "Efficient, Low-Complexity Image Coding with a Set-Partitioning Embedded Block Coder", In IEEE Transactions on Circuits and Systems for Video Technology, vol. 14, No. 11, Nov. 2004, pp. 1219-1235.

"Application to Image Compression", Published on: May 14, 2004, Available at: http://aix1.uottawa.ca~jkhoury/haar.htm.

Yang, et al., "An Overview of Lossless Digital Image Compression Techniques", In Proceedings of 48th Midwest Symposium on Circuits and Systems, Aug. 7, 2005, pp. 1099-1102.

"International Search Report and Written Opinion Issued in PCT Application No. PCT/US2016/040241", Mailed Date: Aug. 31, 2016, 16 Pages.

Chen, et al. "Adaptive Coding of Monochrome and Color Images", In the Proceedings of IEEE Transactions on Communications, vol. Com-25, Issue 11, Nov. 1977, pp. 1285-1292.

Yamamoto, et al. "Content-Based Similarity Retrieval of Images Based on Spatial Color Distributions", In the Proceedings of International Conference on Image Analysis and Processing, Sep. 27, 1999, pp. 951-956.

\* cited by examiner

LOSSLESS IMAGE COMPRESSION FOR FEW-COLORED IMAGES

BACKGROUND

Lossless image compression techniques are preferred in image pre-processing/editing, for archiving in original high quality, in medical imaging, cartoon images, area maps, etc. Existing lossless image compression techniques are not optimized for compressing few-colored images (e.g., 1024 or less colors). For example, the GIF (graphics interchange format) file format is limited to two-hundred and fifty-six colors, but the compression achieved is not optimal. Whereas, the PNG (portable network graphics) file format compresses few-colored images better than GIF, PNG works on principles best-suited for compressing images with thousands or millions of colors. Thus, existing lossless image compression techniques are not optimized for compressing few-colored images.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture utilizes characteristics of high spatial redundancy and few colors in a few-colored image to losslessly compress the image in a hierarchical manner, and store block level information. The entire image is decomposed into fixed-size blocks, and the block color information (single-colored or multi-colored) is stored. All multi-colored blocks are further divided into smaller blocks (sub-blocks) in a lower level, and the sub-block information is stored as well. The process is performed recursively until there are no more multi-colored blocks, or until the block size reaches a minimum size (e.g., a 1×1 block, which is one pixel). The information is then entropy coded (e.g., Huffman encoded).

More generally, the information of each of color block is coded as single-colored or multi-colored. If single colored, the index of this color is stored; if multi-colored, the index of this multi-colored block at this level is stored. For each multi-colored block found in the previous level, break down (decompose) the multi-colored block into smaller rectangular blocks of size $m_i \times n_i$ (for $i^{th}$ level of blocks) and repeat the information coding step for each of the multi-colored blocks. Then repeat the information coding step and multi-color decomposition step until no multi-colored blocks remain to be coded. The list of colors and the hierarchical block information is then coded in the least number of bits. The data obtained from coding step is then entropy encoded (e.g., using Huffman encoding).

More specifically, the disclosed architecture enables block color information coding of the image as single-colored blocks and multi-colored blocks. The entire image is decomposed into blocks of size m×n. Each single-colored block is marked (tagged) as a single-colored block, and with the associated color information. Multi-colored blocks are marked as multi-colored block, and with block index information. Only the multi-colored blocks are recursively decomposed into sub-blocks using smaller block sizes.

Single-colored blocks are saved with an index of the color of its pixels, rather than the full color information itself. Multi-colored blocks of a certain block level are saved with an index of that block in the sequence of multi-colored blocks at that block level. Multi-colored blocks of a certain block level are broken down into sub-blocks of size m×n, where: m may be different from n, or m may be equal to n; m and n can be chosen to be different at each level, or may be same across levels; and, optimal m and n for different block levels can be determined by encoding with different values of m and n, and then checking the resulting encoded size.

All block color information of a particular level is saved before the sequence of sub-blocks information (of only the multi-colored blocks of this level). This enables the progressive decoding (one block level at a time) and display of the image, which is valuable for progressively showing the image, and especially useful for images sent over the networks, such as the Internet.

If the block color information for single-colored blocks and multi-colored blocks are maintained to be of the same number of bits or bytes, this equality provides an additional benefit of random access to get the color information of any block or pixel. Based on this equality, given the information of m×n chosen at each level and given the information of single-colored block and multi-colored block information size, find the block offset of the block into which required pixel falls. If the block is a single-colored block, then the block information provides the color of the pixel as well. If the block is a multi-colored block, jump over the block information of this level, and use the index of this multi-colored block as relates to all multi-colored blocks at this level and the m×n sub-block size chosen, to find the number of sub-blocks to skip. These steps are then repeated until only one or more single-colored sub-blocks are reached or a minimum block size is reached.

In such an encoded file, determining the color information of a certain pixel can be achieved as follows: find the block number which contains the pixel, and check the block information. If the block information indicates the block is a single-colored block, then the pixel is the color of the single-colored block. If the block information indicates the block is a multi-colored block, then jump to the offset where the sub-blocks information exists (based on the multi-colored block index of this block at this level).

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
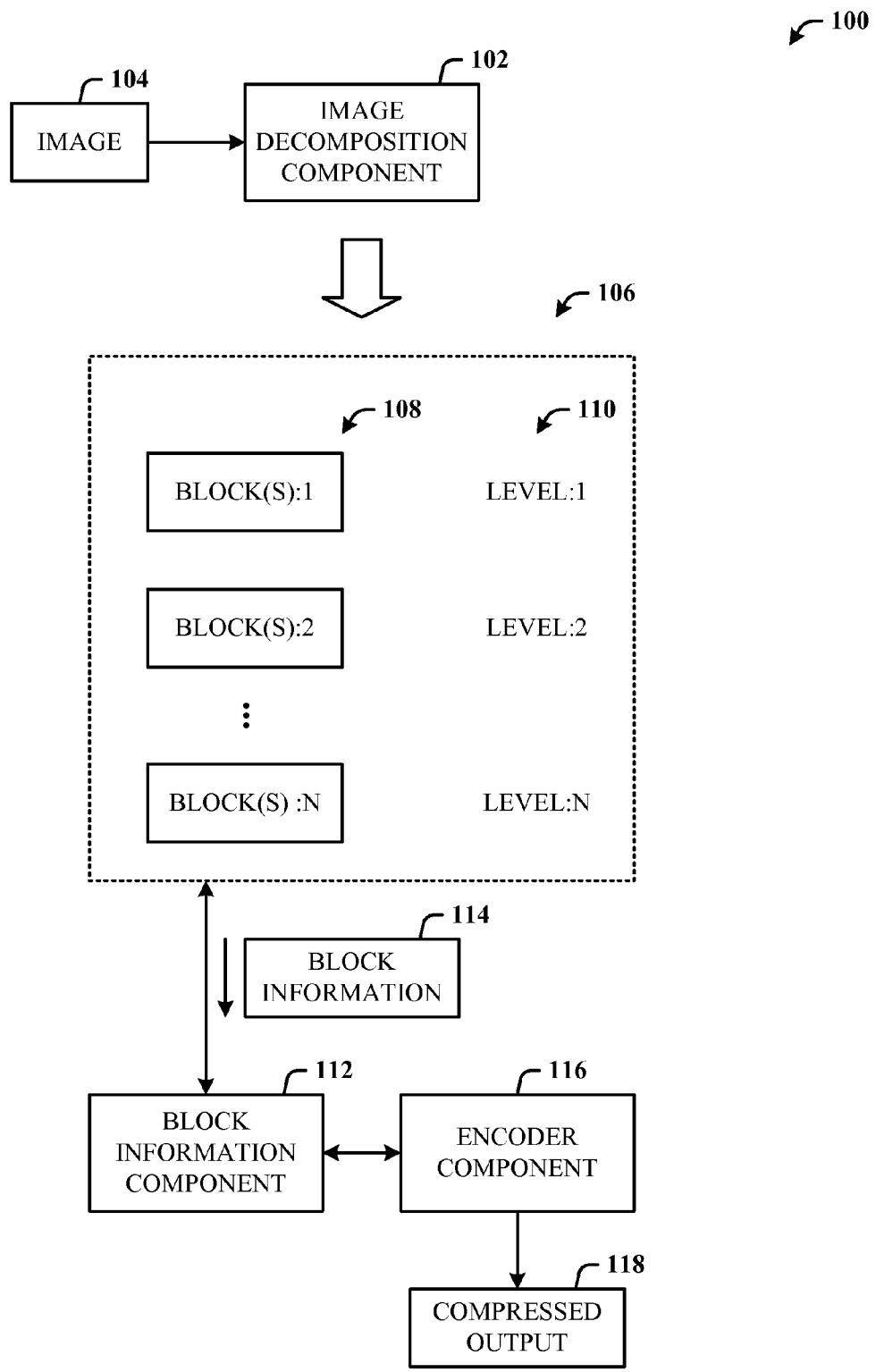
FIG. 1 illustrates an image compression processing system in accordance with the disclosed architecture.

Utilizing an optimal technique suited for "few-colored" images (e.g., 1024 or fewer colors) can provide an improved compression level compared to existing techniques. The improvement is most pronounced in high-resolution images. Additionally, the improvement in the compression level provides savings in disk space and reduction in bandwidth required for transmission over a network.

Few-colored images have a high degree of spatial redundancy, due to the entire image consisting of only a few colors. The disclosed architecture utilizes this fact to compress the image data in a hierarchical manner, and storing block level information.

In operation, the entire image is decomposed into fixed-size blocks, and the block color information (single-colored or multi-colored) is stored. All multi-colored blocks are further divided into smaller blocks (sub-blocks) in a lower level, and the sub-block information is stored as well. The process is performed recursively until there are no more multi-colored blocks, or until the block size reaches a minimum size (i.e., a 1×1 block, which is one pixel). The information can then be entropy coded.

One existing approach divides a block into four quadrants of equal size, which is contrary to the disclosed architecture that uses a block size of m×n and which can be a different size at different levels. Using different block sizes at different levels, where m may not be equal to n, can result in more efficient coding. Moreover, the disclosed architecture treats all multi-colored blocks similarly, while this existing approach uses a shape palette to indicate the positions of colors in a two-colored block. Additionally, the disclosed architecture completes the output of one level of block information before moving to the next level, while an existing approach outputs sub-block information when the block is being processed. In yet another disclosed feature, the disclosed architecture provides the advantage of progressive decode and display of image. Moreover, if the single-block and multi-block information are of same width (in bits), this enables the additional advantage of random access to any pixel information. Still further, the disclosed architecture has no color limitation.

In yet another comparison to existing deficient systems, a second existing approach uses a recursive set partitioning procedure for wavelet coefficients (transformed coefficients), while the disclosed architecture employs recursive decomposition to gather the spatial redundancy in the image. This second approach uses a significance threshold formula to group points into sets, as a step in lossy encoding techniques involving image transform in frequency, while the disclosed architecture is a lossless encoding technique.

The second approach also uses the quad-tree decomposition approach, which breaks down a block into four sub-blocks, which is contrary to the disclosed architecture which uses block sizes of m×n, and which can be different sizes at different levels. The different sizes at different levels and using block sizes of m×n, where m may not be equal to n, can result in a more efficient coding. This second approach used previously coded sub-blocks as context for subsequent sub-blocks, which is contra to the disclosed architecture which does not use any context and codes each block independently. This is advantageous in being able to decode a block independently of the other blocks.

A third deficient existing approach divides an image into blocks, entropy encodes these blocks, and in turn, uses these to entropy encode the image, while the disclosed architecture recursively breaks down a block into sub-blocks. Thus, the third approach exploits the spatially similar regions of an image to achieve compression, while the disclosed architecture utilizes the spatial redundancy in the regions of an image to achieve compression. This third deficient approach does not guarantee lossless compression, which is contra to the disclosed architecture which is a completely lossless technique. Additionally, this third approach encodes the red, blue, green and alpha channels separately, while the disclosed architecture encodes the complete color values and uses the index of color in the coding.

In yet a fourth deficient existing approach, the encoder is a generic block encoder where the image is broken down and processed as blocks, which is contra to the disclosed architecture that recursively breaks down the image into blocks of the same color to exploit the spatial redundancy in the image. This fourth approach also uses quantized colors in the block and is a lossy image encoding technique, which is contra to the disclosed architecture that uses the original colors in the block and is a lossless image encoding technique.

The disclosed architecture exhibits the technical effects of savings in storage space (e.g., disk drives, flash drives, etc.), memory space, and reduced transmission bandwidth, since the file is smaller than otherwise would be used in existing deficient compression techniques.

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an image compression processing system 100 in accordance with the disclosed architecture. The system 100 can include an image decomposition component 102 configured to decompose an entire image 104 into a hierarchical arrangement 106 of blocks 108 of equal size and (a hierarchy of) block levels 110.

Each block level comprises blocks of a single (same) block size. Each level of the block levels 110 can comprise one or more a single-colored blocks (SCBs), one or more multi-colored blocks (MCBs) or combinations of single-colored blocks and multi-colored blocks. However, it is to be understood that any one or more multi-colored blocks of a given level will automatically cause the generation of a new level, and so on, until only single-colored blocks exist in a level. Thus, it is possible that only one level exists if only single-colored blocks exist on that one level.

A block information component 112 is provided and configured to generate and store block information 114 for the blocks 108 (e.g., as a color list), and an encoder component 116 is provided and configured to entropy encode the block information 114 into a compressed output 118. A given single-colored block of the single-colored blocks of a given level can be saved with (as) an index of color(s) of the pixels of the given single-colored block. A given multi-colored block of the multi-colored blocks and of a given block level, can be saved with an index of the given multi-colored block at that level (in other words, the sequence information of the given multi-colored block relative to the multi-colored blocks at that level.

The image decomposition component 102 is configured to decompose to a new hierarchy level for a multi-colored block of a given block level. The image decomposition component 102 is configured to decompose the image until only one or more single-colored blocks exist at a given block level. The block color information for both a single-colored block and a multi-colored block can be maintained as an equal number of bits. The block information comprises block index information of multi-colored blocks and color information of single-colored blocks.

It is to be understood that in the disclosed architecture, certain components may be reoriented, combined, omitted, and additional components may be included. For example, all of the components (102, 122 and 116) can be client-based. In another example, all of the components (102, 122 and 116) can be cloud-based.

Figure 2:
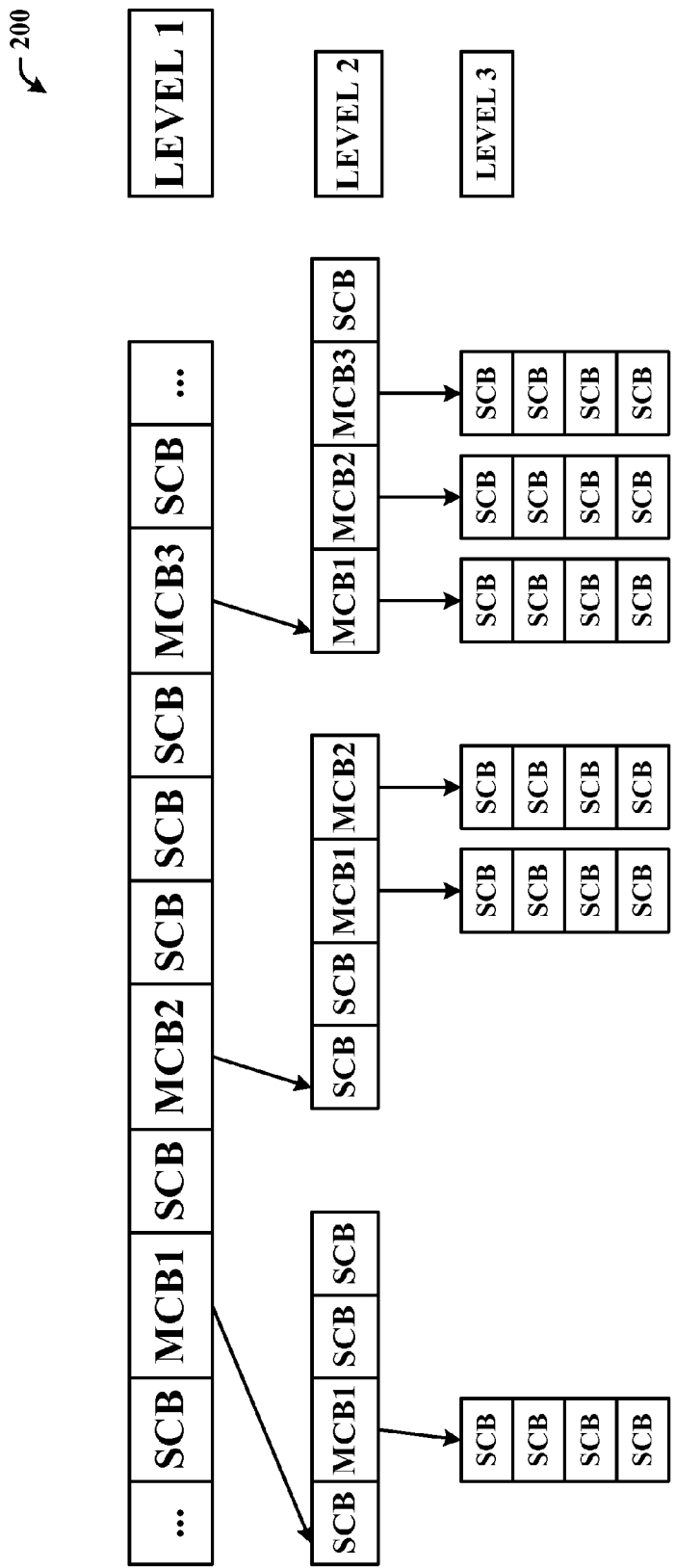
FIG. 2 illustrates a multi-level decomposition hierarchy for few-colored image compression processing in accordance with the disclosed architecture.

FIG. 2 illustrates a multi-level decomposition hierarchy 200 for few-colored image compression processing in accordance with the disclosed architecture. The hierarchy 200 shows three levels (for this description): Level 1, Level 2, and Level 3, where decomposition begins at Level 1, and does not terminate at Level 1, since there exist at least multi-colored blocks (MCB1, MCB2, and MCB3). At Level 1, the color information is generated and stored for each of the single-colored blocks (SCBs) at this level. For the multi-colored blocks, the position of each multi-colored block in the sequence of multi-colored blocks at Level 1, is stored.

Decomposition then generates the next level, Level 2, and decomposes the multi-colored blocks for Level 1, at Level 2. In this example; MCB1 of Level 1 is decomposed into SCB, MCB1, SCB and SCB, at Level 2; MCB2 of Level 1 is decomposed into SCB, SCB, MCB1, and MCB2, at Level 2; and, MCB3 of Level 1 is decomposed into MCB1, MCB2, MCB3 and SCB, at Level 2. At Level 2, the color information is generated and stored for each of the single-colored blocks (SCBs), and the position of each multi-colored block (MCBx) in the sequence of multi-colored blocks at Level 2, is stored.

Since MCBs exist at Level 2, decomposition continues to a next level, Level 3. At Level 3, the first MCB1 in the sequence decomposes to four SCBs, the second MCB1 in the sequence decomposes to four SCBs, the first MCB2 in the sequence decomposes to four SCBs, the second MCB2 in the sequence decomposes to four SCBs, and, the first MCB3 in the sequence decomposes to four SCBs. At Level 3, the color information is generated and stored for each of the single-colored blocks (SCBs). Since no MCBs exist at Level 3, the decomposition terminates.

In a more specific description, the disclosed architecture enables block color information coding of the image as single-colored blocks and multi-colored blocks. The entire image is decomposed into blocks of size m×n. Each single-colored block is marked (tagged) as a single-colored block, and with the associated color information. Multi-colored blocks are marked as multi-colored block, and with block index information. Only the multi-colored blocks are recursively decomposed into sub-blocks using smaller block sizes.

Single-colored blocks are saved with an index of the color of its pixels, rather than the full color information itself. Multi-colored blocks of a certain block level are saved with an index of that block in the sequence of multi-colored blocks at that block level. Multi-colored blocks of a certain block level are broken down into sub-blocks of size m×n, where: m may be different from n, or m may be equal to n; m and n can be chosen to be different at each level, or may be same across levels; and, optimal m and n for different block levels can be determined by encoding with different values of m and n, and then checking the resulting encoded size.

The block color information of a particular level is saved before the sequence of sub-blocks information (of only the multi-colored blocks of this level). This enables the progressive decoding (one block level at a time) and display of the image, which is valuable for progressively showing the image, and especially useful for images sent over the networks, such as the Internet.

If the block color information for single-colored blocks and multi-colored blocks are maintained to be of the same number of bits or bytes, this equality provides an additional benefit of random access to get the color information of any block or pixel. Based on this equality, given the information of m×n chosen at each level and given the information of single-colored block and multi-colored block information size, find the block offset of the block into which required pixel falls. If the block is a single-colored block, that is the color of the pixel as well. If the block is a multi-colored block, jump over the block information of this level, and use the index of this multi-colored block as relates to all multi-colored blocks at this level, and the m×n sub-block size chosen to find the number of sub-blocks to skip. These steps are then repeated until only one or more single-colored sub-blocks are reached.

In such an encoded file, determining the color information of a certain pixel can be achieved as follows: find the block number which contains the pixel, and check the block information. If the block information indicates the block is a single-colored block, then the pixel is the color of the single-colored block. If the block information indicates the block is a multi-colored block, then jump to (the offset) where the sub-blocks information exists (based on the multi-colored block index of this block).

Following is an example operation of the disclosed architecture on a few-colored image. Using an image of 1536× 2048 pixel resolution at the first level, the image is decomposed into 16×32 blocks, for example. The block information for each colored block is marked as single-colored or multi-colored. If the block is marked single-colored, then the index of this color is stored. If block is marked as multi-colored, then the index of this multi-colored block at this level is stored. No further processing is performed on the single-colored blocks. However, further decomposition processing is performed only on the multi-colored blocks. Thus, the multi-colored 16×32 blocks are then coded in a second level as 4×4 blocks, for example. Any single-colored blocks in the second level have the associated color index stored. However, the multi-colored 4×4 blocks are then coded in a third level as 1×1 blocks (one pixel). Coding stops at the third level since all the blocks are now single-colored blocks.

Figure 3:
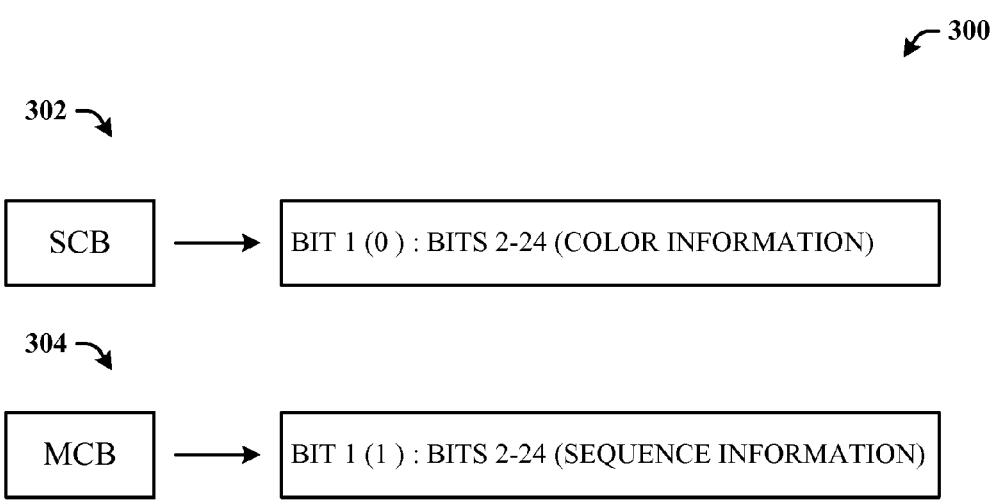
FIG. 3 illustrates exemplary block information coding for few-colored image processing in accordance with the disclosed architecture.

FIG. 3 illustrates exemplary block information coding 300 for few-colored image processing in accordance with the disclosed architecture. Each set of block information can be stored in twenty-four bit words, for example: one bit (zero or one) for marking as a single-colored block or marking as a multi-colored block. The remaining twenty-three bits can be used for color index information (for single-colored blocks), or for index information of multi-colored blocks. These words can then be entropy coded (e.g., using Huffman encoding). However, it should be understood that this is one example bit-word implementation, and that the block information can be stored in smaller bit words such as 8-bit words or 16-bit words, etc. In such cases, the first bit can again, indicate single-colored or multi-colored blocks, and the remaining bits are used for color information or sequence information.

In one implementation where block information is encoded as 24-bit words, the first bit (Bit 1) uses a binary "0" to indicate single-colored and binary "1" multi-colored. The example word 302 for a single-colored block (SCB) is shown, where bits 2-23 are used for color information. The example word 304 for a multi-colored block (MCB) is shown, where bits 2-23 are used for sequence (index) information. In other example, some bits (e.g., two) of the word can be used to indicate the level to which the colored blocks belong.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
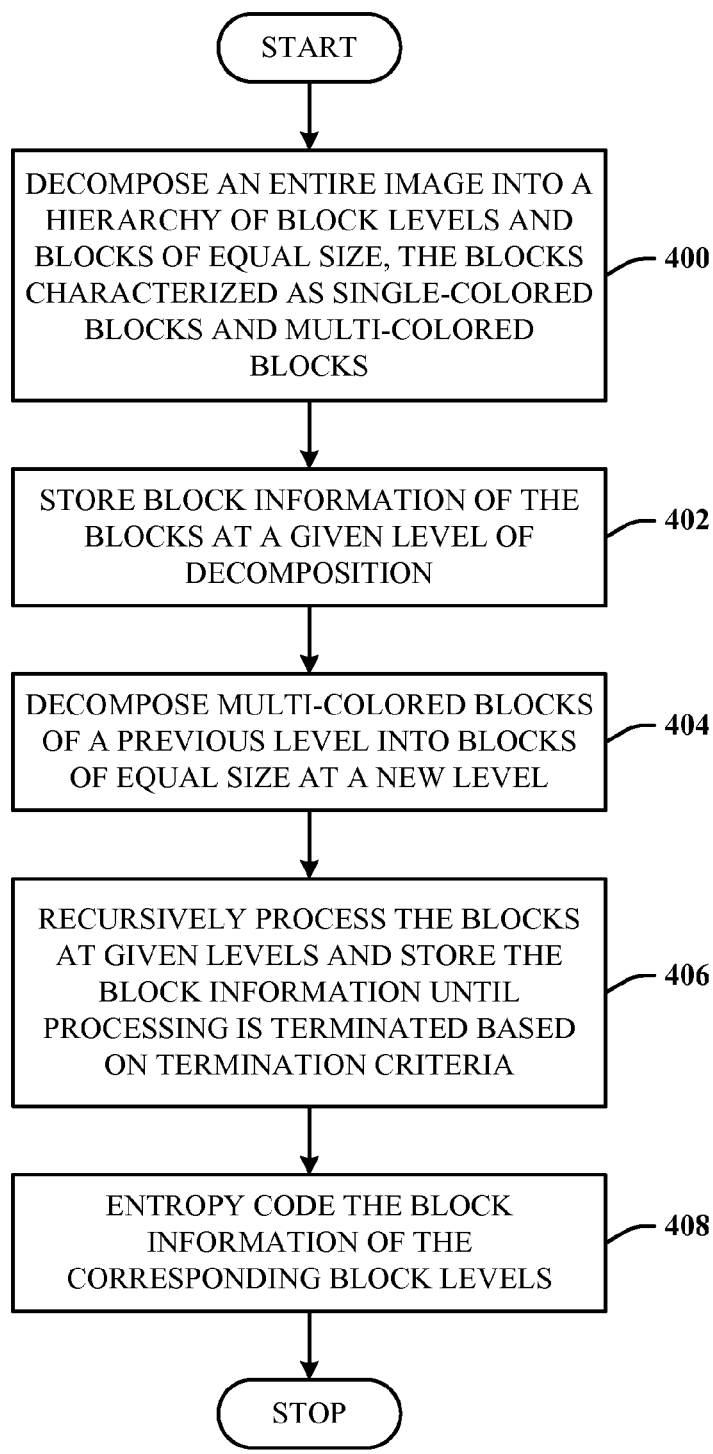
FIG. 4 illustrates a method of compression processing an image in accordance with the disclosed architecture.

FIG. 4 illustrates a method of compression processing an image in accordance with the disclosed architecture. At 400, an entire image is decomposed into blocks of equal size. The blocks are characterized as single-colored blocks and multi-colored blocks. At 402, block information of the blocks at a given level of decomposition are stored. At 404, the multi-colored blocks of a previous level are decomposed into blocks of equal size at a new level. At 406, the blocks at given levels are recursively processed and the block information stored until processing is terminated based on termination criteria. At 408, the block information of the corresponding block levels are entropy coded.

The method can further comprise selecting the block size based on resolution of the image. The method can further comprise decomposing the multi-colored blocks into sub-blocks for the new level, which is a next hierarchical level. The method can further comprise recursively processing the blocks and storing the block information for each level until only single-colored blocks exist at a level.

The method can further comprise generating a new block level based on existence of a multi-colored block at a current level. The method can further comprise storing the block information at each level.

The method can further comprise decoding and displaying the image progressively for each act of recursive processing, thus, showing the image progressively to the user without a jarring effect as each subsequent processing step only further refines the image. The method can further comprise storing block color information of a given block level before a sequence of sub-block information of multi-colored blocks of the given block level.

Figure 5:
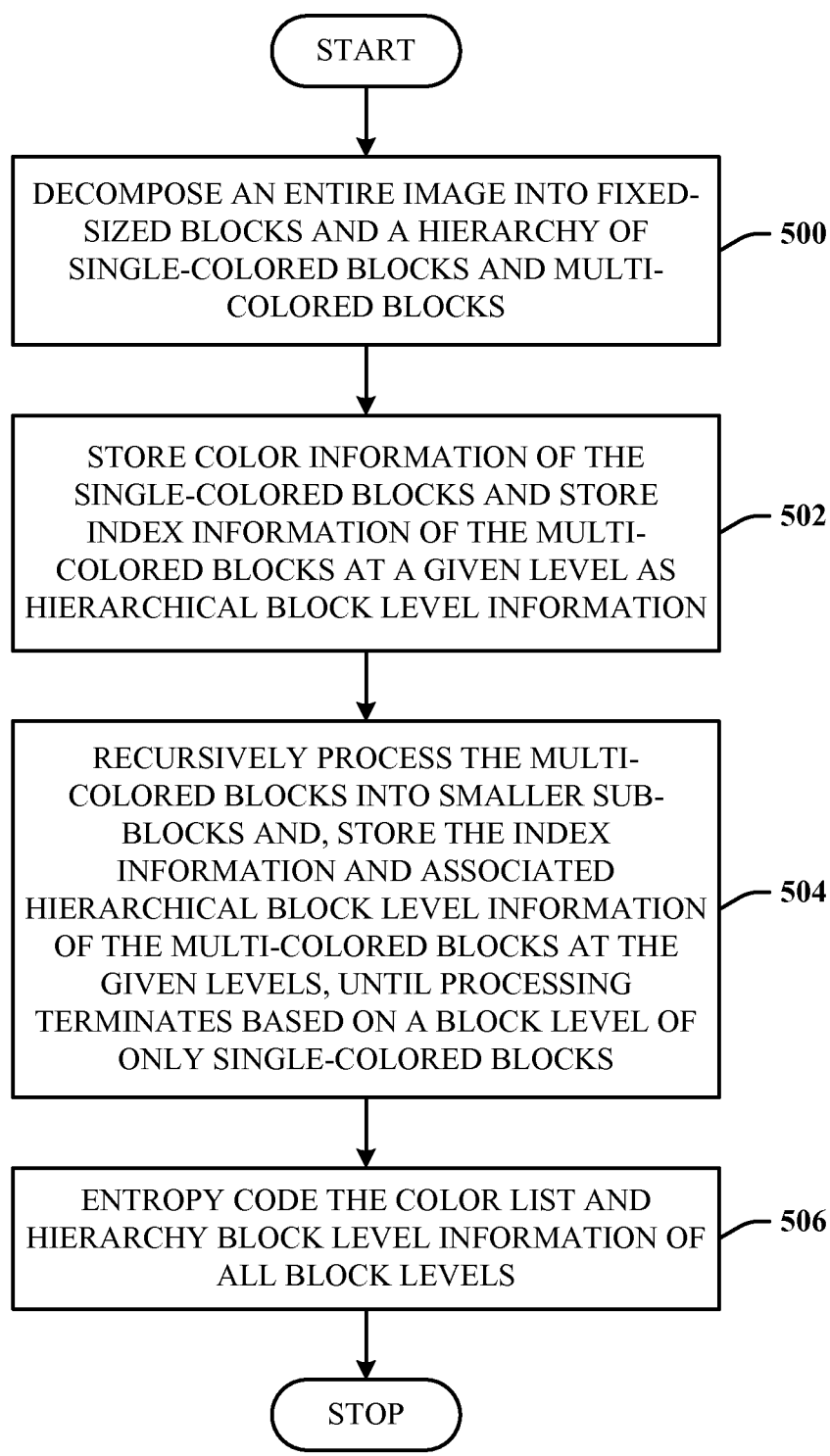
FIG. 5 illustrates an alternative method of compression processing an image in accordance with the disclosed architecture.

FIG. 5 illustrates an alternative method of compression processing an image in accordance with the disclosed architecture. At 500, an entire image is decomposed into fixed-sized blocks and a hierarchy of single-colored blocks and multi-colored blocks. At 502, color information of the single-colored blocks is stored and index information of the multi-colored blocks at a given level is stored as hierarchical block level information. At 504, the multi-colored blocks are recursively processing into smaller sub-blocks and, the index information and associated hierarchical block level information of the multi-colored blocks are stored at the given levels, until processing terminates based on a block level of only single-colored blocks At 506, the color list and hierarchy block level information of all block levels are entropy coded.

The method can further comprise processing the image into fixed-sized blocks of single-colored blocks and multi-colored blocks at different levels. The method can further comprise storing block information of a given block level before a sequence of sub-block information of the given level block.

The method can further comprise, in a given block level of several multi-color blocks, storing block information of a given multi-color block as an index of the given multi-color block in a sequence of the several multi-color blocks at the block level. The method can further comprise storing the color list and all block information of the hierarchy in a least number of bits.

As used in this application, the term "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
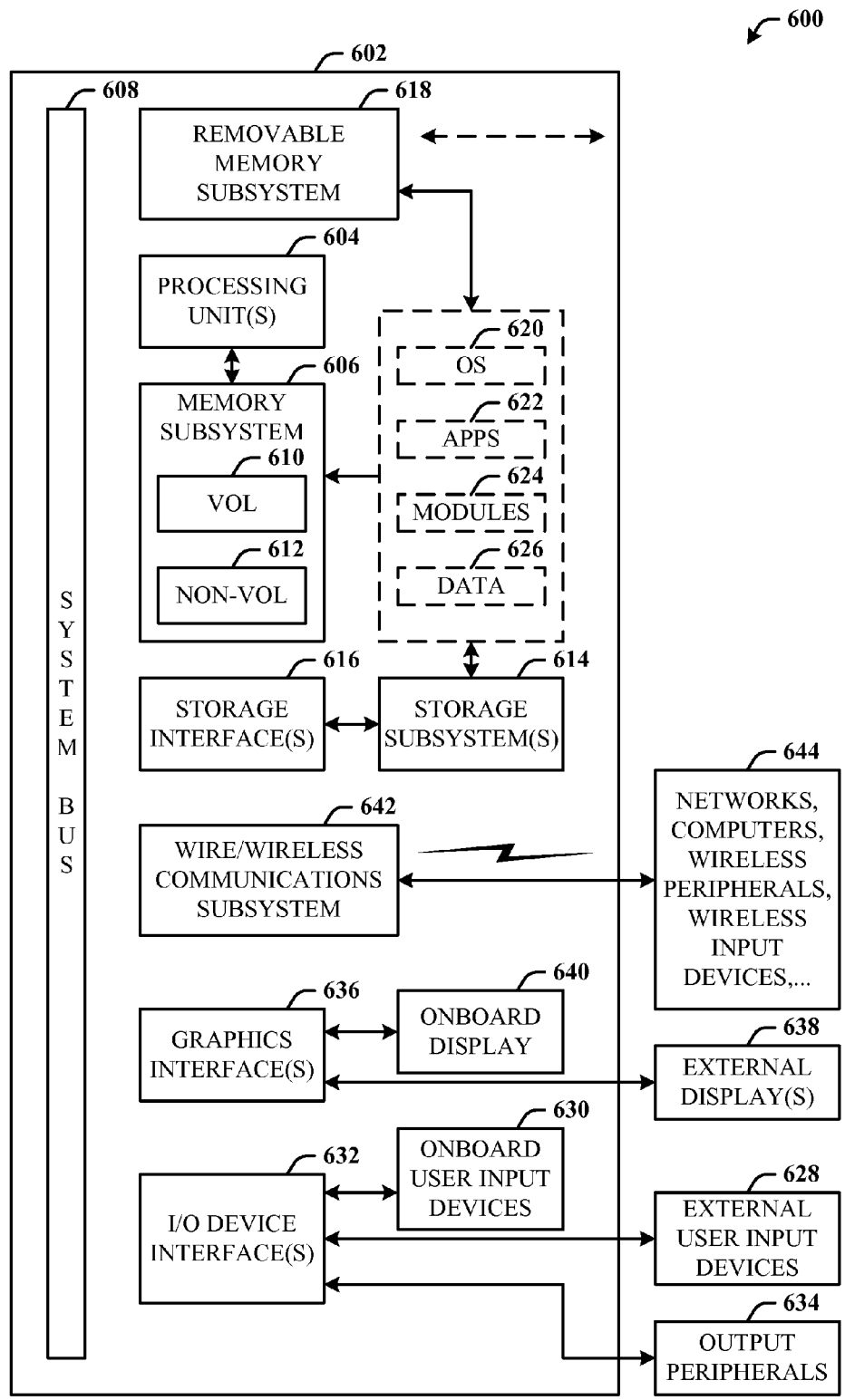
FIG. 6 illustrates a block diagram of a computing system that executes lossless image compression for few-colored images in accordance with the disclosed architecture.

Referring now to FIG. 6, there is illustrated a block diagram of a computing system 600 that executes lossless image compression for few-colored images in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 600 for implementing various aspects includes the computer 602 having microprocessing unit(s) 604 (also referred to as microprocessor(s) and processor(s)), a computer-readable storage medium (where the medium is any physical device or material on which data can be electronically and/or optically stored and retrieved) such as a system memory 606 (computer readable storage medium/media also include magnetic disks, optical disks, solid state drives, external memory systems, and flash memory drives), and a system bus 608. The microprocessing unit(s) 604 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 602 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 606 can include computer-readable storage (physical storage) medium such as a volatile (VOL) memory 610 (e.g., random access memory (RAM)) and a non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the microprocessing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components and circuits. The storage subsystem(s) 614 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include items and components of the system 100 of FIG. 1, multi-level decomposition hierarchy 200 of FIG. 2, the block information as shown in FIG. 3, and the methods represented by the flowcharts of FIGS. 4 and 5, for example.

Generally, programs include routines, methods, data structures, other software components, etc., that perform particular tasks, functions, or implement particular abstract data types. All or portions of the operating system 620, applications 622, modules 624, and/or data 626 can also be cached in memory such as the volatile memory 610 and/or non-volatile memory, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 602, and include volatile and non-volatile internal and/or external media that is removable and/or non-removable. For the computer 602, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 602, programs, and data using external user input devices 628 such as a keyboard and a mouse, as well as by voice commands facilitated by speech recognition. Other external user input devices 628 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 602, programs, and data using onboard user input devices 630 such a touchpad, microphone, keyboard, etc., where the computer 602 is a portable computer, for example.

These and other input devices are connected to the microprocessing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The disclosed architecture can be implemented as an image compression processing system, comprising: means for decomposing an entire image into blocks of equal size, the blocks characterized as single-colored blocks and multi-colored blocks; means for storing block information of the blocks at a given level of decomposition; means for decomposing multi-colored blocks of a previous level into blocks of equal size at a new level; means for recursively processing the blocks at given levels and storing the block information until processing is terminated based on termination criteria; and, means for entropy coding the block information of the corresponding block levels.

The disclosed architecture can be implemented as an alternative image compression processing system, comprising: means for decomposing an entire image into fixed-sized blocks and a hierarchy of single-colored blocks and multi-colored blocks; means for storing color information of the single-colored blocks and storing index information of the multi-colored blocks at a given level as hierarchical block level information; means for recursively processing the multi-colored blocks into smaller sub-blocks and storing the index information and associated hierarchical block level information of the multi-colored blocks at the given levels, until processing terminates based on a block level of only single-colored blocks; and, means for entropy coding the color list and hierarchy block level information of all block levels.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A processor, and a memory device configured with instructions that when executed by the processor, cause the processor to enable an image compression processing system, the system comprising:
   an image decomposition component configured to decompose an entire image into blocks of equal size and a hierarchy of block levels, each block level comprising blocks of a single block size, the block levels comprising at least one of single-colored blocks or multi-colored blocks;
   a block information component configured to generate and store block information for the blocks; and
   an encoder component configured to entropy encode the block information into a compressed output.

2. The system of claim 1, wherein a given single-colored block of the single-colored blocks is saved with an index of color of pixels of the given single-colored block.

3. The system of claim 1, wherein a given multi-colored block of the multi-colored blocks, of a block level, is saved with an index of the given multi-colored block at that block level.

4. The system of claim 1, wherein the image decomposition component is configured to decompose to a new hierarchy level for a multi-colored block of a given block level.

5. The system of claim 1, wherein block color information for both a single-colored block and a multi-colored block is maintained as an equal number of bits.

6. The system of claim 1, wherein the image decomposition component is configured to decompose the image until only one or more single-colored blocks exist at a given block level.

7. The system of claim 1, wherein the block information comprises block index information of multi-colored blocks and color information of single-colored blocks.

8. A computer-implemented method of compression processing an image, comprising computer-executable instructions that when executed by a hardware processor cause the hardware processor to perform acts of:
   decomposing an entire image into blocks of equal size, the blocks characterized as single-colored blocks and multi-colored blocks;
   storing block information of the blocks at a given level of decomposition;
   decomposing multi-colored blocks of a previous level into blocks of equal size at a new level;
   recursively processing the blocks at given levels and storing the block information until processing is terminated based on termination criteria; and
   entropy coding the block information of the corresponding block levels.

9. The method of claim 8, further comprising selecting the block size based on resolution of the image.

10. The method of claim 8, further comprising decomposing the multi-colored blocks into sub-blocks for the new level, which is a next hierarchical level.

11. The method of claim 8, further comprising recursively processing the blocks and storing the block information for each level until only single-colored blocks exist at a level.

12. The method of claim 8, further comprising generating a new block level based on existence of a multi-colored block at a current level.

13. The method of claim 8, further comprising storing the block information at each level.

14. The method of claim 8, further comprising decoding and displaying the image progressively for each act of recursive processing.

15. The method of claim 8, further comprising storing block color information of a given block level before a sequence of sub-block information of multi-colored blocks of the given block level.

16. A computer-implemented method of compression processing an image, comprising computer-executable instructions that when executed by a hardware processor cause the hardware processor to perform acts of:
   decomposing an entire image into fixed-sized blocks and a hierarchy of single-colored blocks and multi-colored blocks;
   storing color information of the single-colored blocks and storing index information of the multi-colored blocks at a given level as hierarchical block level information;
   recursively processing the multi-colored blocks into smaller sub-blocks and storing the index information and associated hierarchical block level information of the multi-colored blocks at the given levels, until processing terminates based on a block level of only single-colored blocks; and
   entropy coding the color list and hierarchy block level information of all block levels.

17. The method of claim 16, further comprising processing the image into fixed-sized blocks of single-colored blocks and multi-colored blocks at different levels.

18. The method of claim 16, further comprising storing block information of a given block level before a sequence of sub-block information of the given level block.

19. The method of claim 16, further comprising, in a given block level of several multi-color blocks, storing block information of a given multi-color block as an index of the given multi-color block in a sequence of the several multi-color blocks at the block level.

20. The method of claim 16, further comprising storing the color list and all block information of the hierarchy in a least number of bits.

* * * * *